Dec. 23, 1930.  W. L. SPALDING  1,785,792
GAS TREATING APPARATUS
Filed Oct. 5, 1925
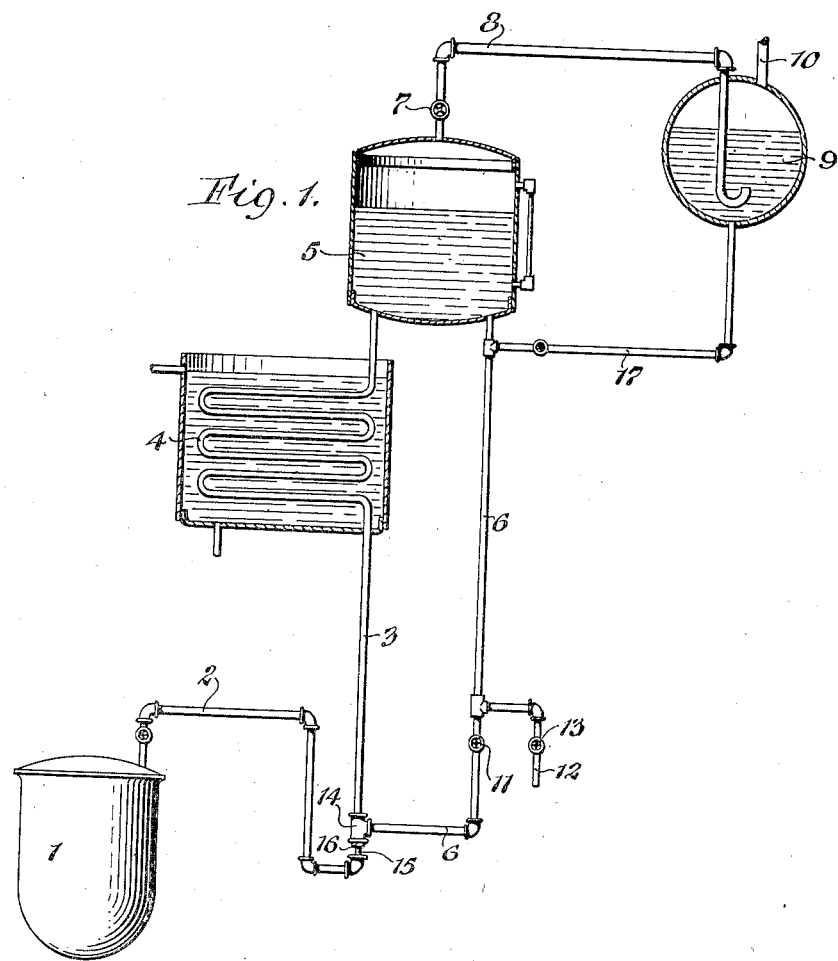
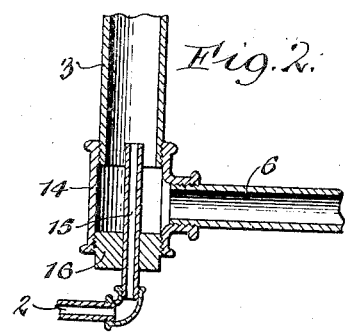
Inventor
WILLIAM L. SPALDING.
by William J. Warslake
Attorney Patented Dec. 23, 1930

1,785,792

UNITED STATES PATENT OFFICE

WILLIAM L. SPALDING, OF BUFFALO, NEW YORK, ASSIGNOR TO NATIONAL ANILINE & CHEMICAL COMPANY, INC., OF NEW YORK, N. Y., A CORPORATION OF NEW YORK

GAS-TREATING APPARATUS

Application filed October 5, 1925. Serial No. 60,442.

This invention relates to an apparatus for the treatment of gases and, in its specific application, for the absorption of ammonia.

The invention, as specifically applied for the purposes of disclosure, provides a liquid circulatory system into which ammonia gas is vented from an autoclave. The ammonia enters the bottom of a riser pipe forming part of the system, and the buoyant effect resulting from the gas absorption, liquid displacement, and heat in the gas, causes an upward flow through the riser. The pipe discharges into the bottom of a cooler, and this in turn into a tank. A downcomer pipe from the tank and connected to the bottom of the first pipe constitutes the return leg of the system. A relief valve for venting any non-condensed gases from the tank is provided, as the system is preferably operated under pressure to give an increased capacity and efficiency of gas absorption.

In the drawing accompanying this specification

Fig. 1 is a diagrammatic showing of an apparatus embodying the invention;

Fig. 2 is a detail showing the gas inlet into the circulatory system.

The gases, generated in an autoclave 1, or by any other suitable means, are led through a pipe 2 into a liquid circulating system. This system comprises a riser pipe 3 which is surrounded or connected at or near its upper end to a cooler 4 and empties into the bottom of a tank 5. A downcomer pipe 6 from the bottom of tank 5 connects with the lower end of the riser 3 and completes the system.

The tank 5 is provided with a relief valve 7, and a pipe 8 for conducting gases leads therefrom into a scrubber 9 which discharges through a pipe 10. With the use of the relief valve, definite pressures can be maintained on the circulatory system.

As difficulty may be experienced in starting operations, on account of a reverse circulation down the pipe 3 caused by the water in the cooler 4 being colder than in the pipe 6, a valve 11 is inserted in the lower end of the downcomer pipe 6. Closing the valve 11 stops this initial flow downward in the pipe 6 and, opening it again immediately after the gas is admitted permits the normal flow to start. However, a properly constructed gas inlet into the pipe 3 is found to be sufficient to start a flow upwardly in pipe 3, and the valve 11 for this purpose becomes unnecessary. A drain 12 and valve 13 are provided to remove the liquor at the end of the operation.

The gas may be admitted into the system in various ways, but a construction that is found satisfactory is shown in Fig. 2. A T 14 connects the riser pipe 3 and the downcomer pipe 6, and a gas inlet tube 15 forming a continuation of the pipe 2 extends into the T in the direction of the riser 3. A plug 16 fits tightly about the tube and in the T to hold the tube in place and prevent any leakage.

From the above description, the operation of the apparatus is believed evident. The hot gases enter the bottom of pipe 3 into the circulating liquid and are more or less absorbed thereby. The unabsorbed gases act as lifting means, while the absorbed gases decrease the specific gravity of the liquid and also impart heat to it. These three factors impel an upward circulation into the cooler 4, where heat is abstracted and further absorption may take place. The fluid mixture passes into the tank 5 where the unabsorbed gases separate, and the excess accumulation of these gases passes through the relief valve. The gases can be collected and scrubbed, as shown, or otherwise disposed of. When the desired degree of gas absorption has taken place, the liquid is drained from the system, and the system is refilled with fresh liquid, or with the solution present in the scrubber 9. For this purpose a valve controlled pipe line 17 connects the scrubber and the tank 5.

By means of this construction an efficient action is secured because of the intimate contact between the liquid and the gas. The use of pressure on the system proportionately increases the capacity and at the same time gives a more efficient gas absorption. The cooler not only abstracts heat for promoting the thermal circulation, but it also assists in the condensation and consequent absorption of the gases. A positive rapid circulation without the need of moving parts is insured by the combination of the three natural forces, the buoyant action of the gases, the decrease in specific gravity caused by absorption and condensation, and the thermal circulation induced by heat in the gases; and the circulation is further accelerated by the ejector construction adopted for the gas inlet, as the velocity in the gases is imparted to the liquid system.

While in its specific application, the apparatus is designed for the absorption of ammonia by water, the apparatus has a more general application. For instance, it can be used as a scrubber for gases that are relatively insoluble as the intimate contact enhanced by the use of pressure renders it efficient in this respect. Other uses of the apparatus within the province of the claims will be apparent to those skilled in the art to which it relates.

I claim:

1. Gas treating apparatus comprising in combination a system for circulating liquid in a cyclic path, means for admitting hot gases into an upwardly circulating portion of liquid in said system to promote circulation, and means for cooling the upper part of said portion.

2. Gas treating apparatus comprising in combination a system for circulating liquid in a cyclic path, means for admitting gases into an upwardly circulating portion of liquid in said system to promote circulation, and means for permitting the escape of the excess gases.

3. Gas treating apparatus comprising in combination a riser, means for cooling said riser at its upper end, a tank connected to said riser at its upper end, a downcomer connecting said tank and said riser, a gas inlet into said riser, and a gas outlet from said tank.

4. Gas treating apparatus comprising in combination a riser, means for cooling said riser at its upper end, a tank connected to said riser at its upper end, a downcomer connecting said tank and said riser, means for injecting gas under pressure into said riser, and a relief valve on said tank for the escape of excess gas.

5. Gas treating apparatus comprising in combination a riser, a cooler associated with said riser at its upper end, a tank connected to said riser at its upper end, a downcomer connecting said tank and said riser, means for admitting gas into said riser, means on said tank for permitting the escape of excess gas, and a scrubber for the excess gas.

6. Gas treating apparatus comprising in combination a riser, a cooler surrounding said riser at its upper end, a tank connected to said riser at its upper end, a downcomer connecting said tank and said riser, means for admitting gas into said riser, means on said tank for permitting the escape of excess gas, a scrubber for the excess gas, and a pipe line connecting said scrubber and said tank whereby liquid may be transferred from said scrubber to said tank.

7. Apparatus for the absorption of gases comprising in combination a liquid circulating system, means for injecting gas into said system, means permitting the escape of unabsorbed gas from the system, a scrubber for the unabsorbed gas, means for removing liquid with absorbed gas from the system, and means for filling the system with liquid from the scrubber.

8. Apparatus for the absorption of gaseous ammonia comprising in combination an aqueous liquid circulating system provided with a riser, a cooler associated with the upper end of said riser, a tank connected with the upper end of said riser, a downcomer connecting said tank with the lower end of said riser, and means in said riser for injecting gaseous ammonia under pressure whereby the circulation of liquid in said system and the absorption of ammonia in said liquid are promoted.

In testimony whereof I affix my signature.
WILLIAM L. SPALDING.